(12) United States Patent
Hara

(10) Patent No.: US 7,916,957 B2
(45) Date of Patent: Mar. 29, 2011

(54) LINE NOISE ELIMINATING APPARATUS, LINE NOISE ELIMINATING METHOD, AND LINE NOISE ELIMINATING PROGRAM

(75) Inventor: Masanori Hara, Tokyo (JP)

(73) Assignee: NEC Corporation, Tokyo (JP)

( * ) Notice: Subject to any disclaimer, the term of this patent is extended or adjusted under 35 U.S.C. 154(b) by 908 days.

(21) Appl. No.: 11/833,165

(22) Filed: Aug. 2, 2007

(65) Prior Publication Data

US 2008/0031531 A1    Feb. 7, 2008

(30) Foreign Application Priority Data

Aug. 3, 2006  (JP) .................................. 2006-212660

(51) Int. Cl.
*G06K 9/36* (2006.01)
*G06K 9/40* (2006.01)
(52) U.S. Cl. ........................................ 382/237; 382/254
(58) Field of Classification Search .................. 382/124, 382/125, 237, 254, 275
See application file for complete search history.

(56) References Cited

U.S. PATENT DOCUMENTS

| 6,360,021 | B1 * | 3/2002 | McCarthy et al. | 382/254 |
| 6,990,249 | B2 * | 1/2006 | Nomura | 382/254 |
| 6,990,252 | B2 * | 1/2006 | Shekter | 382/276 |
| 7,415,145 | B2 * | 8/2008 | Hsieh et al. | 382/131 |
| 7,756,312 | B2 * | 7/2010 | Hsieh et al. | 382/128 |

FOREIGN PATENT DOCUMENTS

| JP | 01-43349 A | 2/1989 |
| JP | 08-272956 A | 10/1996 |
| JP | 8-315135 A | 11/1996 |
| JP | 2000-82110 A | 3/2000 |
| JP | 2000-261680 A | 9/2000 |
| JP | 2001-101399 A | 4/2001 |
| JP | 2002-99912 A | 4/2002 |
| JP | 3465226 B2 | 8/2003 |
| JP | 2004-234333 A | 8/2004 |
| JP | 2005-010842 A | 1/2005 |

OTHER PUBLICATIONS

Cannon, M., et al., "Background Pattern Removal by Power Spectral Filtering", Applied Optics, Mar. 15, 1983. pp. 777-779, vol. 22, No. 6, Optical Society of America.

(Continued)

*Primary Examiner* — Bhavesh M Mehta
*Assistant Examiner* — Stephen R Koziol
(74) *Attorney, Agent, or Firm* — Sughrue Mion, PLLC

(57) ABSTRACT

To provide a line noise eliminating apparatus and the like, with which the picture quality of the area that has no line noise is not deteriorated, and a line noise having no periodicity can be eliminated. The line noise eliminating apparatus includes: an image binarizing device which generates a binary image by an input image; a line noise reliability calculating device which calculates an edge feature quantity for each of black-pixel consecutive areas in the rotated images, and calculates line noise reliability based on the edge feature quantities; a line noise area determining device which determines the line noise areas that correspond to each of the rotation angle candidates based on the line noise reliability; a density converting device which generates a density-converted image by applying local image enhancement on an area that corresponds to the line noise area of the input image so as to generate a density-converted image.

17 Claims, 16 Drawing Sheets

OTHER PUBLICATIONS

Hong, et al., "Finger Image Enhancement: Algorithm and Performance Evaluation (1998)", IEEE Transactions on Pattern Analysis and Machine Intelligence, 1998, pp. 1-30.

ANSI/NIST-ITL-1-2000 Data Format for the Interchange of Fingerprint, Facial, & Scar mark & Tattoo (SMT) Information that is standardized by National Institute of Standards and Technology, 2000.

* cited by examiner

INPUT IMAGE (GI)

ENHANCED IMAGE (GE)

BINARY IMAGE (B)

ROTATED BINARY IMAGE B(45)

ROTATED ENHANCED IMAGE GE(45)

LINE NOISE PLANE (LC(d))

LINE NOISE PLANE (LA(d))

DENSITY-CONVERTED IMAGE (GR(45))

OUTPUT IMAGE (GO)

INPUT IMAGE GI

ENHANCED IMAGE GE

LINE-NOISE ELIMINATED
IMAGE GR' (15)

LINE-NOISE ELIMINATED
IMAGE GR' (106)

SYNTHESIZED IMAGE GC

INPUT IMAGE GI

LINE-NOISE ELIMINATED IMAGE GO

FIRST FINGERPRINT IMAGE EXAMPLE

SECOND FINGERPRINT
IMAGE EXAMPLE

LINE NOISE ELIMINATING APPARATUS, LINE NOISE ELIMINATING METHOD, AND LINE NOISE ELIMINATING PROGRAM

BACKGROUND OF THE INVENTION

1. Field of the Invention

This application is based upon and claims the benefit of priority from Japanese patent application No. 2006-212660, filed on Aug. 3, 2006, the disclosure of which is incorporated herein in its entirety by reference.

The present invention relates to an apparatus and the like used for processing a digital image with many background noises, such as an image of a latent fingerprint, by using a computer. More specifically, the present invention relates to a line noise eliminating apparatus and the like, which can effectively eliminate the noise of straight-line form.

2. Description of the Related Art

In general, a fingerprint including a great number of ridgelines in streaked patterns has two outstanding features; one is that it is immutable throughout one's life, and the other is that nobody has the same fingerprint. Therefore, fingerprints have been used in criminal investigations from old times. In particular, collation using the latent fingerprints left behind in criminal scenes is effective as a way to help the investigations. Recently, many police forces have employed a fingerprint matching system that uses a computer, and conduct matching of the latent fingerprints.

However, many of the images of the latent fingerprints are of low quality with a noise, which makes it difficult for an investigator to make a judgment. This is also a large factor for hindering the system from being automated. There are many kinds of background noises in the latent fingerprints. One of those is a straight-form line. FIG. 6 illustrates an example of a latent fingerprint left on a check. As in the example shown in FIG. 6, there are cases where fingerprint ridgelines are left on the ruled lines of the check or on the background noise of a line pattern. With a related technique, such line noises are likely to be misjudged and extracted as the fingerprint ridgelines, so that it is difficult to enhance or extract only the fingerprint ridgelines.

As a related technique for eliminating the background pattern noise, it is common to employ Fourier transformation. Such technique is proposed in "Background Pattern Removal by Power Spectral Filtering" by Cannon, et al., Applied Optics, Mar. 15, 1983 (Non-patent Document 1), for example.

When this technique is employed for eliminating the line noises from a fingerprint image, it is necessary for the line noises to appear periodically. Thus, the effect thereof is limited. Further, when the periodicity of the line noises is similar to the periodicity of the fingerprint ridgelines, the fingerprint ridgelines are eliminated as well. Thus, the effect thereof is limited in that sense as well. Furthermore, the density of the fingerprint ridgelines in the area with no line noise is deteriorated with the line noise eliminating processing, so that the effect thereof is also limited.

FIG. 16B illustrates the state where the line noises are eliminated from the fingerprint image of FIG. 14A by the related technique. In the case where the periodicity of the line noises is insignificant as in the case of this fingerprint image, the eliminating performance is not sufficient.

FIG. 16A illustrates the state where the line noises are eliminated from the fingerprint image of FIG. 6 by the related technique. It can be seen from this example of fingerprint image that the density of the fingerprint ridgelines is also deteriorated.

Further, there are various measures proposed as a related method for enhancing the fingerprint ridgelines, in which the direction and periodicity of local ridge lines are extracted, and the ridgelines are enhanced through filter processing that corresponds to the extracted direction and periodicity. This method is proposed in "Fingerprint Image Enhancement: Algorithm and Performance Evaluation (1998)" by Hong, et al., IEEE Transactions on Pattern Analysis and Machine Intelligence (Non-patent Document 2) and Japanese Unexamined Patent Publication 2002-99912 (Patent Document 1).

However, such related technique is not effective when the direction and periodicity of the ridge lines cannot be extracted properly due to the influence of the line noise. Thus, the issue still remains to be overcome.

Furthermore, as a related technique for eliminating the line noise, Japanese Unexamined Patent Publication 2000-82110 (Patent Document 2) proposes a method for eliminating the ruled lines in particular. The method for detecting the ruled lines proposed therein calculates a black run towards a designated direction, and detects a peak of the histogram to recognize it as the ruled line.

However, when such related technique is employed for the fingerprint image, the fingerprint ridgelines may be mistakenly judged as the ruled lines. Thus, such method is not effective. The reason for this is that the straight-form fingerprint ridgelines and wide-width fingerprint ridgelines have long black runs.

Further, Japanese Unexamined Patent Publication 148-315135 (Patent Document 3) proposes a method as a related technique for detecting line segments in a drawing. However, this method detects the peak of an image histogram towards a designated direction to recognize the line segment.

When such related technique is employed for the fingerprint image, however, the fingerprint ridgelines may be mistakenly judged as the line segments. Thus, such method is not effective. The reason for this is that the straight-form fingerprint ridgelines and wide-width fingerprint ridgelines have a large image histogram.

Japanese Unexamined Patent Publication 2004-234333 (Patent Document 4) proposes a method as another related technique for detecting the line segment, in which edges are detected from an input image, and Hough transformation is applied to a binary image (the edges are binarized) so as to extract the line segment.

However, it is not possible to extract the line noise that crosses with the fingerprint ridge lines, even if this technique is employed for the latent fingerprint image with a conspicuous line noise. Thus, this method is not effective. The reason for this is that the edges of the line noises crossing with many fingerprint ridgelines become intermittent short line segments, so that the components after Hough transformation becomes insignificant.

Meanwhile, as a method for eliminating a local background noise, a local contrast stretch method (Adaptive Contrast Stretch) and a local histogram equalization method (Adaptive Histogram Equalization) are known to be effective. However, the enhancing effect cannot be expected with the local enhancing methods, unless the reference area is set properly.

For example, JP Patent Publication No. 3465226 (Patent Document 5) discloses an image density converting method capable of reducing the elimination of effective information through dividing an input image based on texture analysis, and determining the degree of smoothening the density histogram in accordance with the dimension of the dynamic range for each divided area.

However, even if the input image is divided into each area based on the texture analysis as proposed in Patent Document 5, it is difficult to accurately divide the area of the background noise such as the line noise. Therefore, the reference area covers over the background noise area as well as the non-background noise area in the vicinity of the border of the background noise. As a result, the reference area cannot be limited only to the background noise area, so that it is not possible to obtain the result of density conversion as it is expected. Further, the density converting method proposed in Patent Document 5 depends largely on the accuracy of area dividing method executed based on the texture analysis of the input image. Thus, the result of enhancement is deteriorated if the line noise area cannot be extracted properly.

SUMMARY OF THE INVENTION

As described above, when there is a part that is difficult to be discriminated from the line noise contained in the image or when there is no periodicity in the line noise, it is not possible to eliminate the line noise without deteriorating the quality of the image.

An exemplary object of the present invention therefore is to provide a line noise eliminating apparatus and the like, with which the picture quality is not deteriorated in the area with no line noise, and the line noises that have no periodicity can be eliminated as well.

A first line noise eliminating apparatus according to an exemplary aspect of the present invention includes: an image binarizing device which generates a binary image by binarizing an input image that includes a line noise; a line noise reliability calculating device which rotates the binary image by a plurality of rotation angles to generate respective rotated images, calculates an edge feature quantity for each of black-pixel consecutive areas in the rotated images, and calculates line noise reliability based on the edge feature quantities; a line noise area determining device which selects, based on the line noise reliability, a rotation angle candidate with which a direction of the line noise becomes consistent with a prescribed direction from the rotation angles, and determines a line noise area of the respective rotated images that correspond to each of the rotation angle candidates based on the line noise reliability; a density converting device which generates a density-converted image by applying local image enhancement on an area that corresponds to the line noise area of the input image so as to convert the density into density of pixels that correspond to the input image; and an image synthesizing device which generates a synthesized image by synthesizing the density-converted images that correspond to each of the rotation angle candidates, when there are a plurality of the rotation angle candidates.

With the first line noise eliminating apparatus, not only the number of consecutive black pixels in a given direction, but also the white pixel ratio of the lines adjacent to the line of the consecutive black pixels in the orthogonal direction is also detected as the edge feature quantity from the binary image. Then, the line noise is detected based on a combination of the number of consecutive black pixels and the edge feature quantity. Thus, the straight-form wide area with consecutive black pixels such as a fingerprint ridgeline is not mistakenly detected as a line noise.

Further, the first line noise eliminating device calculates the line noise reliability with each rotation angle to determine the rotation angle candidate with which the line noise becomes consistent with a prescribed direction such as the X-axis direction, and determines the line noise area of the image that is rotated by the rotation angle candidate. Therefore, it is possible to eliminate the line noises in a plurality of directions. At that time, the line noise area is determined without depending on the periodicity of the line noise Thus, it is possible to eliminate the line noise that has no periodicity (such as a case with only a single line noise) or the line noise that has a periodicity similar to that of a part of the original image (for example, the line noise that has a periodicity similar to the fingerprint ridgeline).

It is noted here that the line noise area includes a determined area that is judged as being a part of the line noise, and the area that is in the vicinity of the determined area.

A second line noise eliminating apparatus according to an exemplary aspect of the present invention includes: an image enhancing device which generates a density-enhanced image by applying local image enhancement on an input image that includes a line noise; an image binarizing device which generates a binary image by binarizing the input image; a line noise reliability calculating device which rotates the binary image by a plurality of rotation angles to generate respective rotated images, calculates an edge feature quantity for each of black-pixel consecutive areas in the rotated images, and calculates line noise reliability based on the edge feature quantities; a line noise area determining device which selects, based on the line noise reliability, a rotation angle candidate with which a direction of the line noise becomes consistent with a prescribed direction from the rotation angles, and determines a line noise area of the respective rotated images that correspond to each of the rotation angle candidates based on the line noise reliability; a density converting device which generates a density-converted image by applying local image enhancement, by a similar method as that of the image enhancing device, on an area that corresponds to the line noise area of the input image so as to convert the density to density of pixels that correspond to the density-enhanced image; and an image synthesizing device which generates a synthesized image by synthesizing the density-converted images that correspond to each of the rotation angle candidates, when there are a plurality of the rotation angle candidates.

Like the first line noise eliminating apparatus, the second line noise eliminating apparatus does not mistakenly detect the straight-form wide area with consecutive black pixels such as a fingerprint ridgeline as a line noise. Further, it is possible to eliminate the line noises in a plurality of directions. It is also possible to eliminate the line noise that has no periodicity (such as a case with only a single line noise) or the line noise that has a periodicity similar to that of a part of the original image (for example, the line noise that has a periodicity similar to the fingerprint ridgeline).

Furthermore, it is possible with the image enhancing device to generate a noise-eliminated image in which the density levels inside and outside the line noise area are equalized. Moreover, even when there is a conspicuous background noise, the background density after performing elimination processing on the noise area can be converted into the density of the same level as the background density of the image area that has no noise. Therefore, it is possible to eliminate the line noise effectively even from a latent fingerprint image that is left on a check, for example.

A first line noise eliminating method according to an exemplary aspect of the present invention includes the steps of: an image binarizing step which generates a binary image by binarizing an input image that includes a line noise; a line noise reliability calculating step which rotates the binary image by a plurality of rotation angles to generate respective rotated images, calculates an edge feature quantity for each of black-pixel consecutive areas in the rotated images, and calculates line noise reliability based on the edge feature quantities; a line noise area determining step which selects, based on the line noise reliability, a rotation angle candidate with which a direction of the line noise becomes consistent with a prescribed direction from the rotation angles, and determines a line noise area of the respective rotated images that correspond to each of the rotation angle candidates based on the line noise reliability; a density conversion step which generates a density-converted image by applying local image enhancement on an area that corresponds to the line noise area of the input image so as to convert the density to density of pixels that correspond to the input image; and an image synthesizing step which generates a synthesized image by synthesizing the density-converted images that correspond to each of the rotation angle candidates, when there are a plurality of the rotation angle candidates.

Like the case of the first line noise eliminating apparatus, the straight-form wide area with consecutive black pixels such as a fingerprint ridgeline is not mistakenly detected as a line noise with the first line noise eliminating method.

Further, it is possible to eliminate the line noises in a plurality of directions. It is also possible to eliminate the line noise that has no periodicity (such as a case with only a single line noise) or the line noise that has a periodicity similar to a part of the original image (for example, the line noise that has a periodicity similar to the fingerprint ridgeline).

A second line noise eliminating method according to an exemplary aspect of the present invention includes the steps of: an image enhancing step which generates a density-enhanced image by applying local image enhancement on an input image that includes a line noise; an image binarizing step which generates a binary image by binarizing the input image; a line noise reliability calculating step which rotates the binary image by a plurality of rotation angles to generate respective rotated images, calculates an edge feature quantity for each of black-pixel consecutive areas in the rotated images, and calculates line noise reliability based on the edge feature quantities; a line noise area determining step which selects, based on the line noise reliability, a rotation angle candidate with which a direction of the line noise becomes consistent with a prescribed direction from the rotation angles, and determines a line noise area of the respective rotated images that correspond to each of the rotation angle candidates based on the line noise reliability; a density conversion step which generates a density-converted image by applying local image enhancement, by a similar method as that of the image enhancing step, on an area that corresponds to the line noise area of the input image so as to convert the density to density of pixels that correspond to the density-enhanced image; and an image synthesizing step which generates a synthesized image by synthesizing the density-converted images that correspond to each of the rotation angle candidates, when there are a plurality of the rotation angle candidates.

Like the first line noise eliminating method, the straight-form wide area with consecutive black pixels such as a fingerprint ridgeline is not mistakenly detected as a line noise with the second line noise eliminating method. Further, it is possible to eliminate the line noises in a plurality of directions. It is also possible to eliminate the line noise that has no periodicity (such as a case with only a single line noise) or the line noise that has a periodicity similar to that of a part of the original image (for example, the line noise that has a periodicity similar to the fingerprint ridgeline).

Furthermore, it is possible with the image enhancing step to generate a line noise-eliminated image in which the density levels inside and outside the noise area are equalized. Moreover, even when there is a conspicuous background noise, the background density after performing elimination processing on the noise area can be converted into the density of the same level as the background density of the image area that has no noise. Therefore, it is possible to eliminate the line noise effectively even from a latent fingerprint image that is left on a check, for example.

A line noise eliminating program according to an exemplary aspect of the present invention allows a computer to execute: image enhancement processing to generate a density-enhanced image by applying local image enhancement on an input image that includes a line noise; image binarization processing to generate a binary image by binarizing the input image; line noise reliability calculation processing to rotate the binary image by a plurality of rotation angles so as to generate respective rotated images, calculate an edge feature quantity for each of black-pixel consecutive areas in the rotated images, and calculate line noise reliability based on the edge feature quantities; line noise area determining processing to select, based on the line noise reliability, a rotation angle candidate with which a direction of the line noise becomes consistent with a prescribed direction from the rotation angles, and determine a line noise area of the respective rotated images that correspond to each of the rotation angle candidates based on the line noise reliability; density conversion processing to generate a density-converted image by applying local image enhancement, by a similar method as that of the image enhancement processing, on an area that corresponds to the line noise area of the input image so as to convert the density to density of pixels that correspond to the density-enhanced image; and image synthesizing processing to generate a synthesized image by synthesizing the density-converted images that correspond to each of the rotation angle candidates, when there are a plurality of the rotation angle candidates.

The line noise eliminating program does not mistakenly detect the straight-form wide area with consecutive black pixels such as a finger print ridgeline as a line noise. Further, it is possible to eliminate the line noises in a plurality of directions. It is also possible to eliminate the line noise that has no periodicity (such as a case with only a single line noise) or the line noise that has a periodicity similar to that of a part of the original image (for example, the line noise that has a periodicity similar to the fingerprint ridgeline).

Furthermore, it is possible with the image enhancement processing to generate a noise-eliminated image in which the density levels inside and outside the line noise area are equalized. Moreover, even when there is a conspicuous background noise, the background density after performing elimination processing on the noise area can be converted into the density of the same level as the background density of the image area that has no noise. Therefore, it is possible to eliminate the line noise effectively even from a latent fingerprint image that is left on a check, for example.

As an exemplary advantage of the present invention, not only the number of consecutive black pixels in a given direction, but also the white pixel ratio of the lines adjacent to the line of the consecutive black pixels in the orthogonal direction is also detected as the edge feature quantity from the binary image. Then, the line noise is detected based on a combination of the number of consecutive black pixels and the edge feature quantity. Thus, the straight-form wide area with consecutive black pixels such as a fingerprint ridgeline is not mistakenly detected as a line noise.

Further, the line noise reliability is calculated with each rotation angle to determine the rotation angle candidate with which the line noise becomes consistent with a prescribed direction such as the X-axis direction, and the line noise areas is determined in the image that is rotated by the rotation angle candidate. Therefore, it is possible to eliminate the line noises in a plurality of directions. At that time, the line noise area is determined without depending on the periodicity of the line noise. Thus, it is possible to eliminate the line noise that has no periodicity (such as a case with only a single line noise) or the line noise that has a periodicity similar to that of a part of the original image (for example, the line noise that has a periodicity similar to the fingerprint ridgeline).

DETAILED DESCRIPTION OF EXEMPLARY EMBODIMENT

In the followings, the structure and operation of a fingerprint image enhancing apparatus 10 (an example of a line noise eliminating apparatus) as an exemplary embodiment of the present invention will be described by referring to the accompanying drawings.

(Structure of Fingerprint Image Enhancing Apparatus 10)

Figure 1:
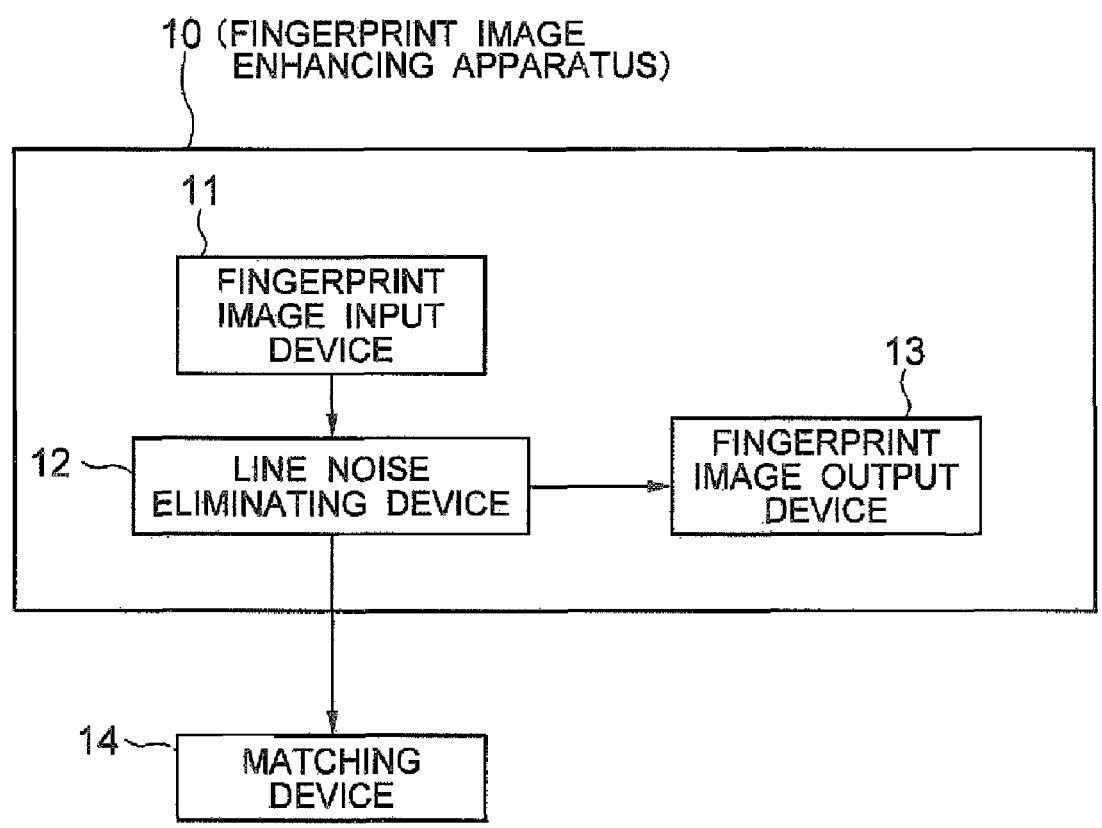
FIG. 1 is an overall structural block diagram of a fingerprint image enhancing apparatus as an exemplary embodiment of the present invention.

FIG. 1 is a functional block diagram for showing the structure of the fingerprint image enhancing apparatus 10.

The fingerprint image enhancing apparatus 10 is a personal computer, for example, and provided with a fingerprint image input device 11, a line noise eliminating device 12, and a fingerprint image output device 13.

The fingerprint image input device 11 digitizes and inputs fingerprint images that are read out by a sensor or a scanner, for example. Further, the fingerprint image input device 11 may input already-digitized images in a form of file.

The line noise eliminating device 12 has a function of eliminating the straight-form line noise from the fingerprint image (input image) inputted through the fingerprint image input device 11 and enhancing the ridgeline density.

The fingerprint image output device 13 outputs the fingerprint image that is processed by the line noise eliminating device 12 to a monitor, a printer, or the like.

Further, as a way of example, it is also possible to transmit the fingerprint image processed by the line noise eliminating device 12 directly to a matching device 14 or the like.

Figure 2:
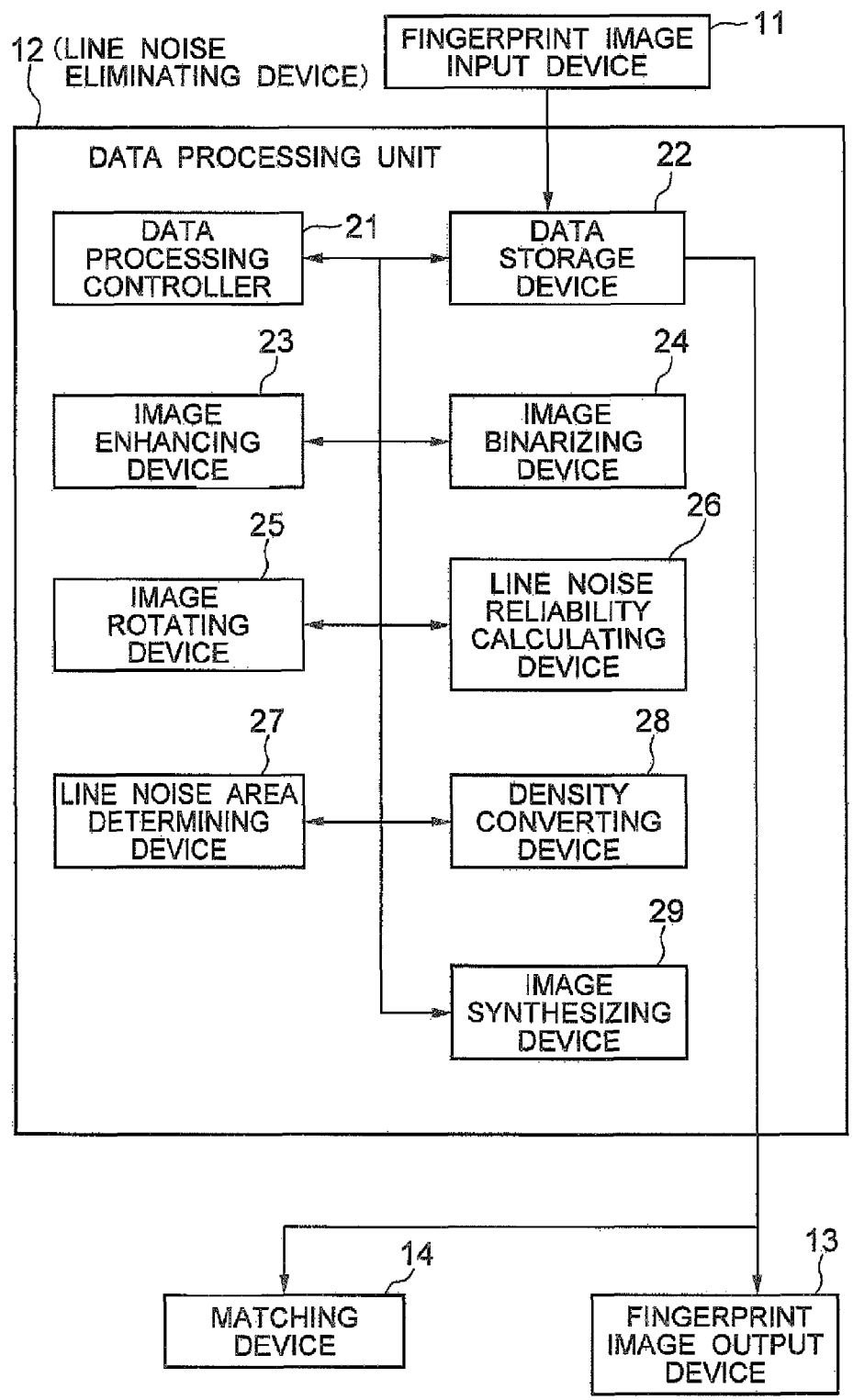
FIG. 2 is a functional block diagram of a line noise eliminating device shown in FIG. 1.

FIG. 2 is a functional block diagram for showing the structure of the line noise eliminating device 12.

The line noise eliminating device 12 includes: a data processing controller 21; a data storage device (memory device) 22; an image enhancing device 23; an image binarizing device 24; an image rotating device 25; a line noise reliability calculating device 26; a line noise area determining device 27; a density converting device 28; and an image synthesizing device 29.

The data processing controller 21 controls transmission and reception of data and messages exchanged between each of the devices that compose the line noise eliminating device 12

The data storage device 22 includes a RAM (Random Access Memory), for example, and each of the aforementioned devices that compose the line noise eliminating device 12 uses it as the work area. Further, it is also used for temporarily storing the information calculated by each device. Furthermore, the data storage device 22 is also used as the work area of each devices such as the image enhancing device 23, the image binarizing device 24, the image rotating device 25, the line noise reliability calculating device 26, the line noise area determining device 27, the density converting device 28, and the image synthesizing device 29.

The image enhancing device 23 includes a function of generating an enhanced image by enhancing the density of the input image using a local image enhancing method.

The image binarizing device 24 includes a function of generating a binary image by converting the input image into two values of white or black.

The image rotating device 25 includes a function of generating a rotated image that is obtained through rotating the binary image by a designated rotation angle.

The line noise reliability calculating device 26 includes functions of: extracting and analyzing horizontal lines from the binary image; calculating the continuous length of the black pixels in the horizontal direction and the edge ratio;

calculating the line noise reliability by combining the obtained values; and registering it to the line noise plane.

The line noise area determining device 27 includes functions of: analyzing the binary image and the line noise plane to which the line noise reliability is registered so as to determine the line noise area; and registering it to the line noise plane.

The density converting device 28 includes functions of: specifying the line noise area from the line noise plane to which the line noise area is registered; enhancing the input image by using the local image enhancing method (that considers only the group of pixels in the horizontal direction as the reference area) for each pixel within the line noise area of the image that is enhanced by the density enhancing device; and replacing it with the density value of the corresponding pixels of the enhanced image.

The image synthesizing device 29 includes a function of synthesizing a plurality of images (from which the line noise is eliminated) into a single image from which the lines noises in a plurality of directions are eliminated by selecting the minimum density values of each pixel.

Each of the above-described devices can be achieved by having a CPU (Central Processing Unit) of the fingerprint image enhancing apparatus 10 execute a computer program and control the hardware of the fingerprint image enhancing apparatus 10.

Figure 3:
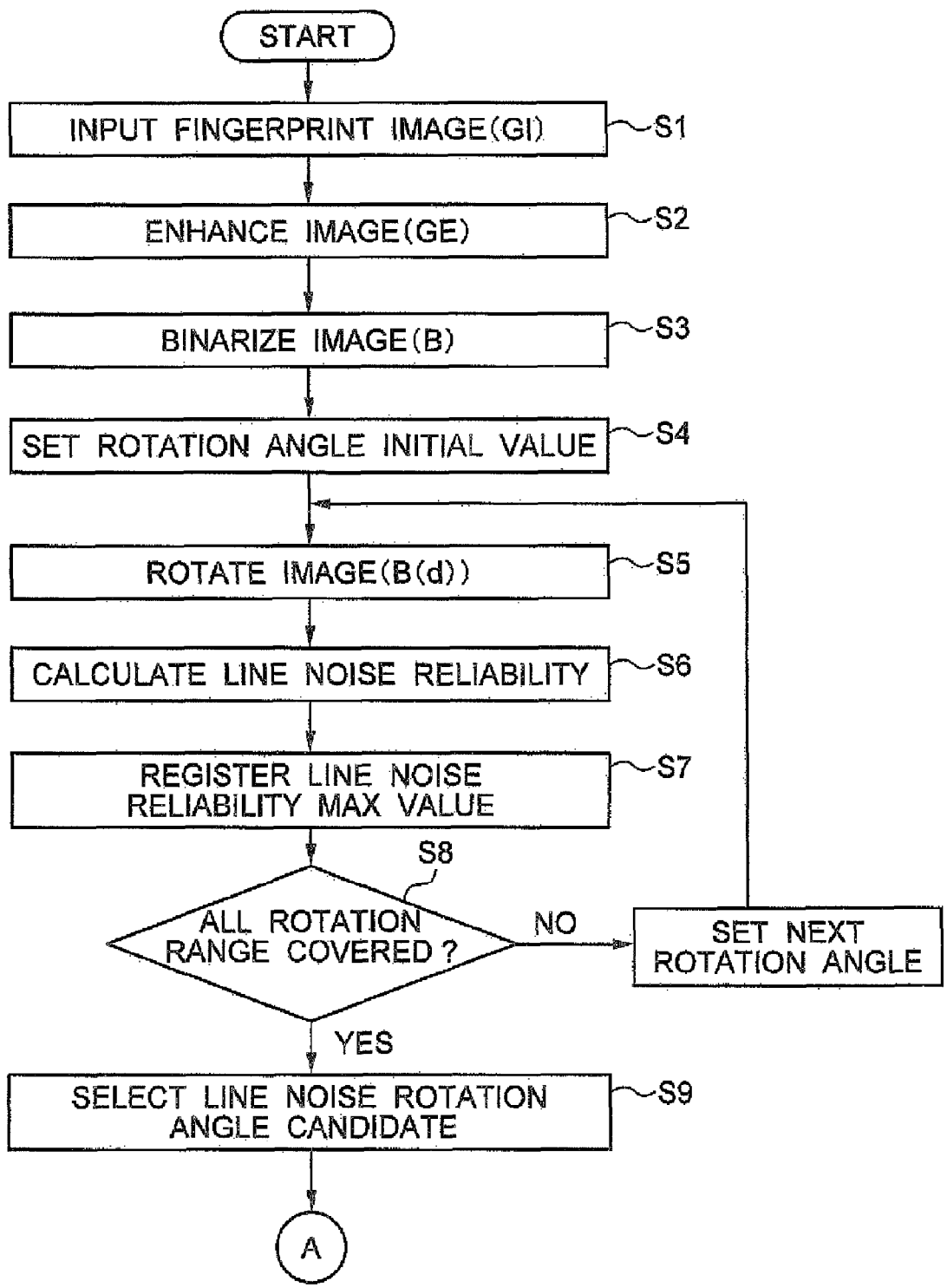
FIG. 3 is a flowchart for showing the operation of the fingerprint image enhancing apparatus.
Figure 4:
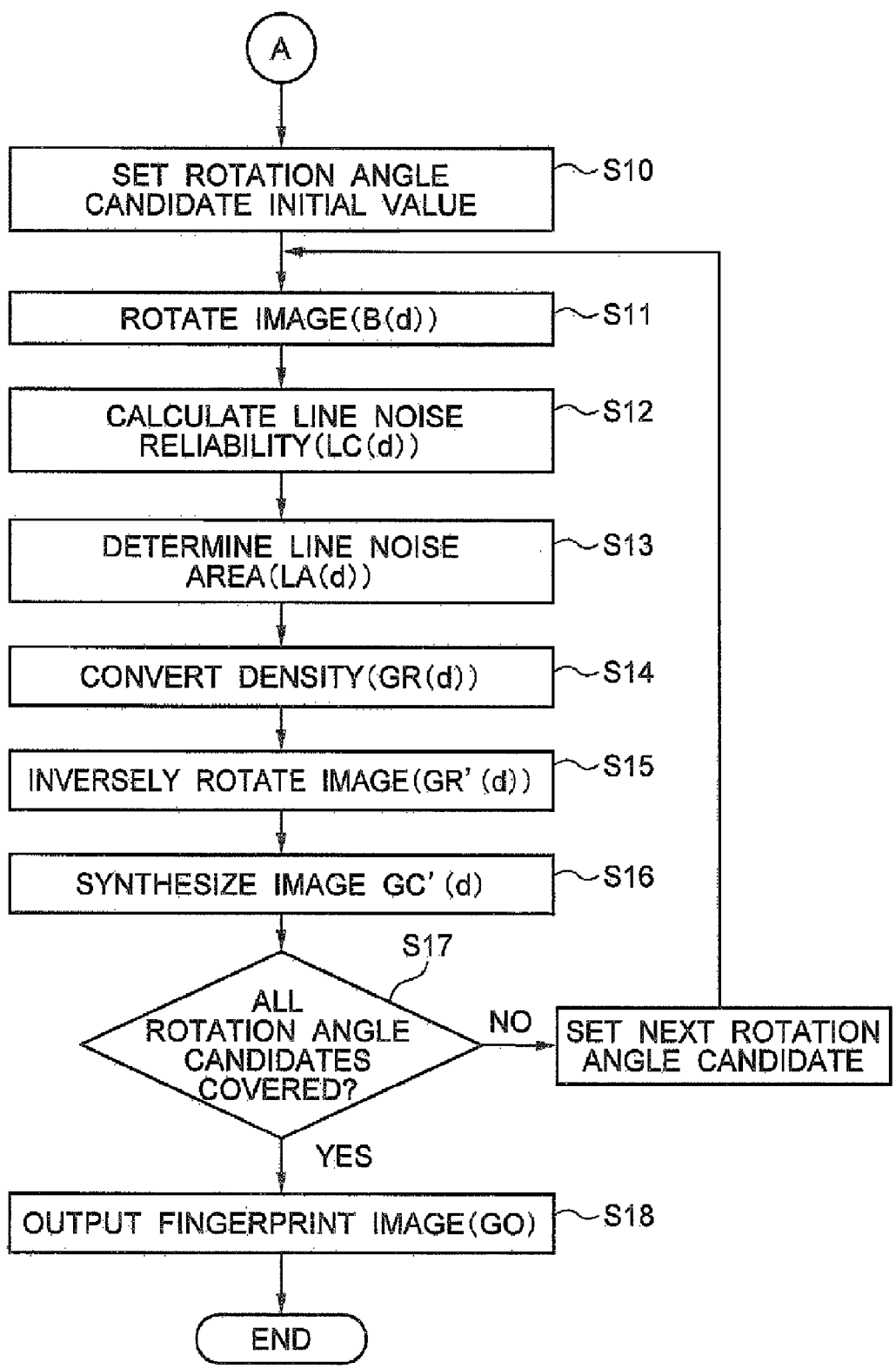
FIG. 4 is a flowchart for showing the operation of the fingerprint image enhancing apparatus.

FIG. 3 and FIG. 4 are flowcharts for showing the operations of the entire line noise eliminating device 12, the fingerprint image input device 11, and the fingerprint image output device 13.

In step S1 of FIG. 3, the fingerprint image input device 11 shown in FIG. 2 inputs a fingerprint image. In this step, an image read out by a scanner, for example, is digitized and inputted. Further, it is also possible to input an already-digitized fingerprint image file, as another way of example. This fingerprint image is expressed as GI.

Figure 6:
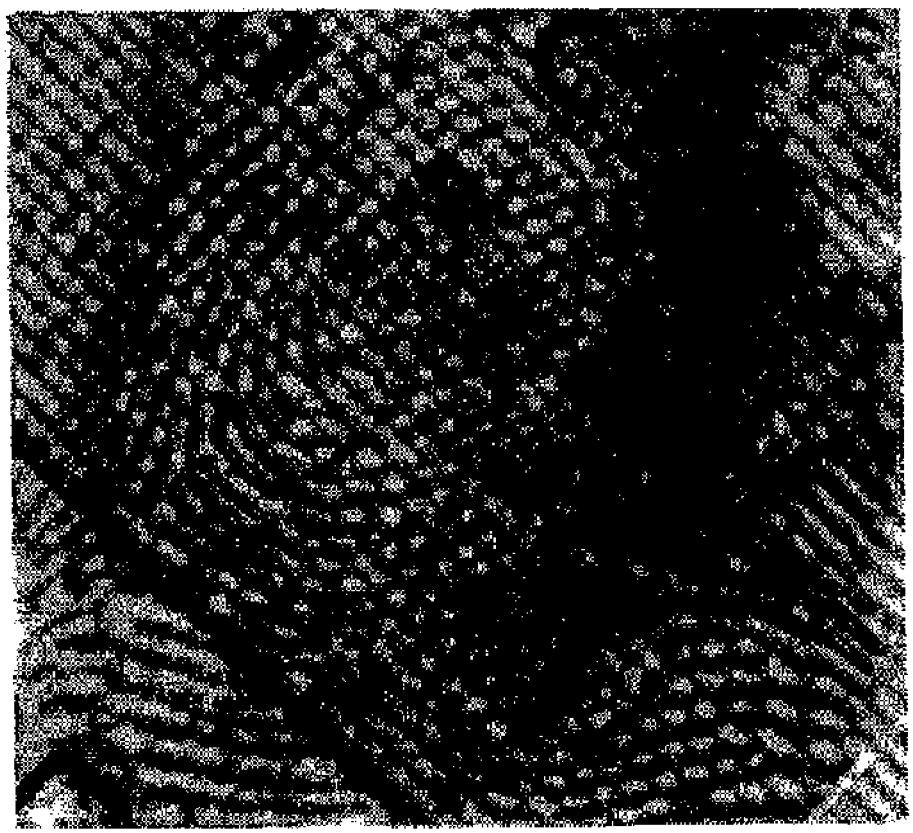
FIG. 6 is an illustration for showing an example of an input image.

The examples of the finger print images such as the one shown in FIG. 6 are the images obtained by digitizing the fingerprint images that are read out by a sensor or a scanner. Those fingerprint image examples are digitized with the resolution of 500 dpi according to "ANSI/NIST-ITL-1-2000 Data Format for the Interchange of Fingerprint, Facial, & Scar Mark & Tattoo (SMT) Information" that is standardized by National Institute of Standards and Technology (US). This standardization document can be downloaded from the following URL (as of June, 2006). ftp://sequoyah.nist.gov/pub/nist_internal_reports/sp500-245-a16.pdf With the aforementioned standard, the image is digitized to have the density values of two-hundred and fifty-six gradations from 0 to 255. Further, the density values are defined with the luminance standards where the numerical values increase as the luminance becomes higher (brighter). In the exemplary embodiment of the present invention, however, explanations regarding the density values are provided on the basis of the density standards where the numerical values increase as the density becomes higher. Therefore, the ridgeline with high density has the value close to 255 as the maximum value, and the paper surface or the ridgeline grooves with low density has the density value close to 0.

Further, in the fingerprint image of this standard, there are lines from the top to the bottom, which are raster-scanned from the left to the right with the upper-left vertex as the start point.

Figure 7:
FIG. 7 is an illustration for showing an example of an enhanced image that is obtained by applying enhancement processing on the input image of FIG. 6.

Next, in step S2 of FIG. 3, the image enhancing device 23 shown in FIG. 2 enhances the density of the input image and expands the dynamic range of the fingerprint ridgelines. For the enhancing method, the adaptive histogram equalization or the adaptive contrast stretch is suitable, for example. Even in an area where the dynamic range of the fingerprint ridgelines is narrow, it is possible to obtain an image that has a uniform contrast change over the whole area through performing enhancement by using the adaptive histogram equalization. Size setting of the reference area is important with the adaptive histogram equalization. It is set in this case as a circle with a radius of about sixteen pixels. The average pitch between the ridgelines of the fingerprint is about ten pixels (the actual distance is 0.5 mm), so that it is appropriate to set the circle with the radius of about 1.6 times the average ridgeline pitch as the minimum area that includes the contract change of the ridgeline. FIG. 7 shows an image that is obtained by applying the above-described processing to enhance the input image of FIG. 6. This fingerprint image is expressed as GE. It can be seen from FIG. 6 that both the area with high background density and the area with low background area density are enhanced uniformly.

Figure 8:
FIG. 8 is an illustration for showing an example of a binary image that is obtained by binarizing the enhanced image of FIG. 7.

Then, in step S3 of FIG. 3, the image binarizing device 24 shown in FIG. 2 converts the contrast image that is enhanced by the image enhancing device 23 into a binary image of white and black. Among many kinds of proposed binarizing techniques, this example employed a simple binary processing that takes the intermediate value (127) as a threshold value, because the image is already being enhanced. FIG. 8 shows a binary image that is obtained by applying the aforementioned processing on the enhanced image GE of FIG. 7. This fingerprint image is expressed as B.

When there is a line noise in an arbitrary direction in this example, the line noise is detected and eliminated after rotating the image in such a manner that the line noise becomes horizontal. It is also possible to rotate a mask used for detecting the line noise without rotating the image. However, this example rotates the image so as to improve the detection/elimination performance while simplifying detection and elimination processing of the line noise.

The processing hereinafter is broadly separated into two.

The first-half processing is the processing from step S4 to step S9 of FIG. 3, in which the rotation angle of the image in accordance with the direction of the line noise is detected. There are cases where a latent fingerprint includes a plurality of line noises in different directions. Therefore, a plurality of rotation angle candidates are set to deal with such case.

The latter-half processing is the processing of S10 and thereafter shown in FIG. 4, in which elimination processing of the line noise is performed after rotating the image by all the rotation angle candidates, and each of the noise-eliminated images is synthesized to generate the final noise-eliminated image.

In the step S4 of FIG. 3, the image rotating device 25 sets 0 as the initial value of the rotation angle d (d=0).

Then, in step S5 of FIG. 3, the image rotating device 25 shown in FIG. 2 rotates the above-described binary image by the designated rotation angle d. Typical affine transformation may be employed as the technique for rotating the image.

Figure 9A:
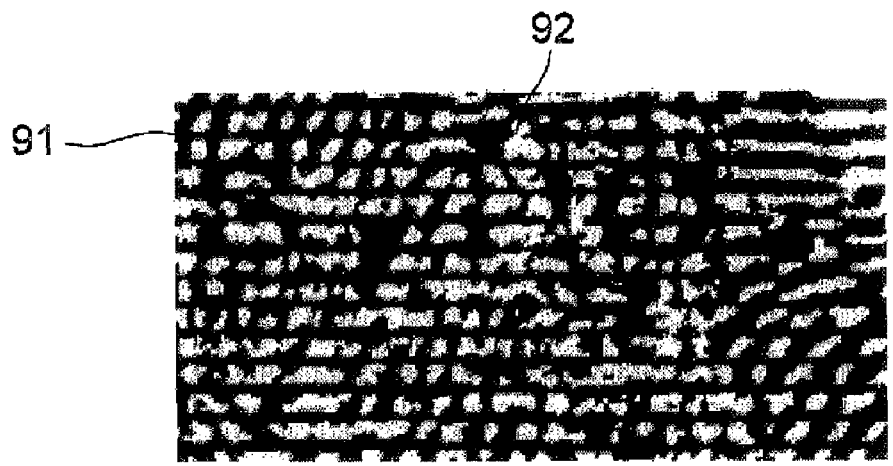
FIG. 9A is an illustration for showing a part of rotated image of the binary image shown in FIG. 8.
Figure 9B:
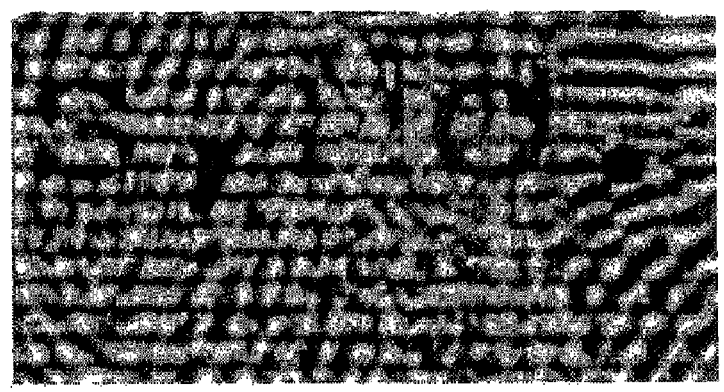
FIG. 9B is an illustration for showing a part of rotated image of the enhanced image shown in FIG. 7.

FIG. 9A shows a fragmentary enlarged view of the image that is obtained by rotating the binary image of FIG. 8 by 45 degrees in a counterclockwise direction. This fingerprint image is expressed as B(d). An enhanced image of the same area as the one shown in FIG. 9A is shown in FIG. 9B as a reference This fingerprint image is expressed as GE (d). The lines noise of this fingerprint image example can be detected most conspicuously when the image is rotated by 45 degrees, so that d is 45 degrees.

Next, in step S6 of FIG. 3, the line noise reliability calculating device 26 analyzes each horizontal line of the binary image, calculates the number of consecutive black pixels and the edge feature quantity, and combines those to calculate the line noise reliability. The number of consecutive black pixels is referred to as a black run herein.

This processing is the core of the present invention, so that it will be described in detail.

In the case of a latent fingerprint that is left behind, the line noise is generated due to the ruled line of a check or the like, and there are black pixels appeared continuously. Therefore, the base of detection may be considered as a black run. However, the fingerprint ridge lines in the vicinity of the trifles in the bottom part of the fingerprint may become straight form and the ridgeline width therein is wide. Thus, the black run therein may become long. In general, when the line noise is compared with the fingerprint ridgeline in a straight line, the straight-form edges appear clearly for the line noise, while the straight-form edges do not clearly appear for the fingerprint ridgeline since the edges thereof form a gentle curve even through it seems to be in a straight form at a glance. Therefore, the edge feature quantity is employed to discriminate the fingerprint ridgelines from the line noise. This example employs a ratio of the total number of white pixels (that are adjacent to the black run pixel group) to the black run as the edge feature quantity. This ratio is referred to as an edge ratio. Normally, the edge ratio of a straight-form noise is larger than the edge ratio of a fingerprint ridgeline.

Next, contents of the processing executed in the step S6 of FIG. 3 will be described in detail by referring to the flowchart shown in FIG. 5.

Figure 5:
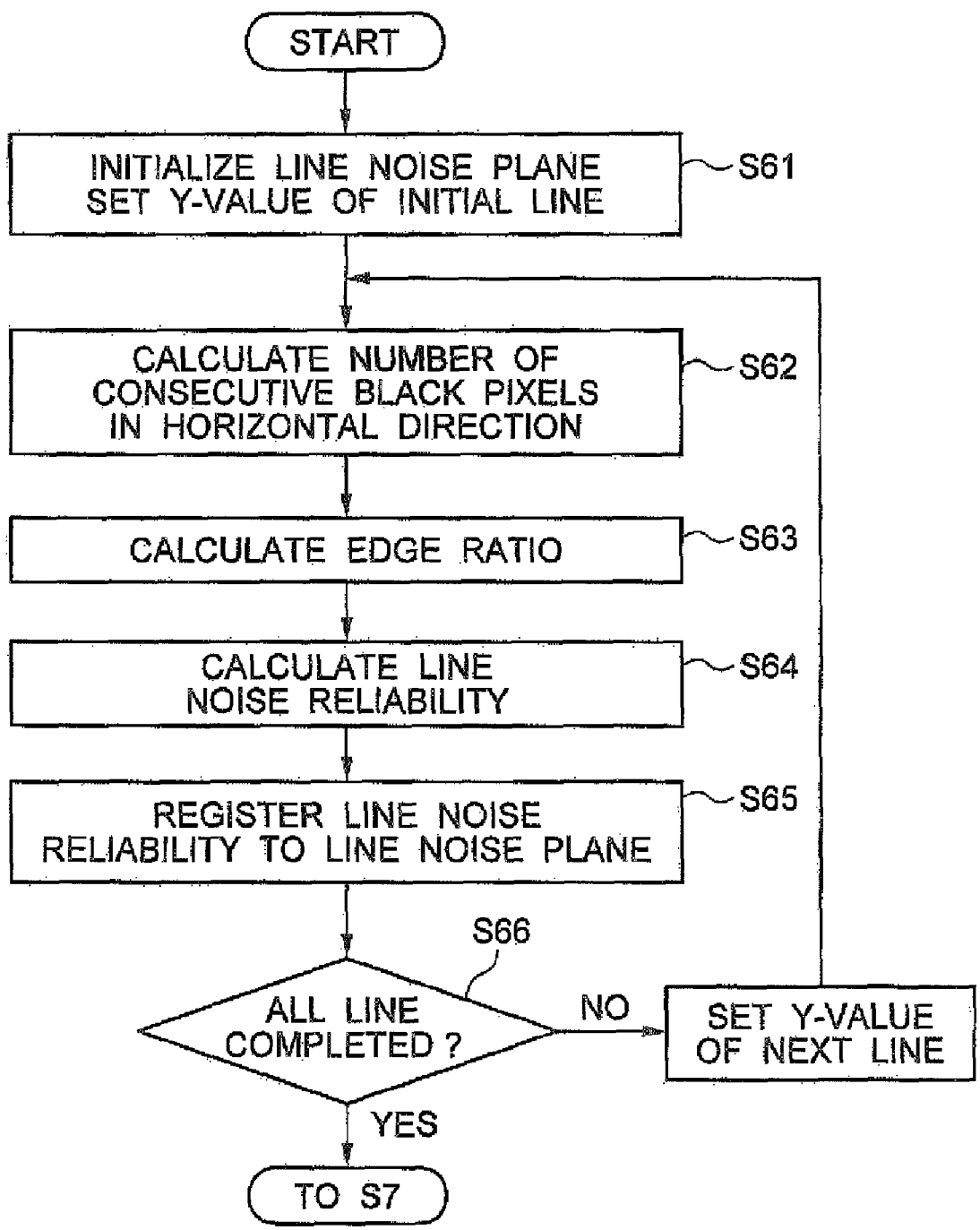
FIG. 5 is a flowchart for showing the details of a line noise reliability calculating operation executed by the fingerprint image enhancing apparatus.

In step S61 of FIG. 5, the line noise plane is initialized. The line noise plane is an image plane for temporarily registering the line noise reliability of each pixel of the input image. The highest line (Y-coordinate value=0) is set as the line initial value. The coordinate system defined herein is the Cartesian coordinate system where the upper-left vertex is the origin, the horizontal direction facing towards the right direction is the X-coordinate positive direction, and the vertical direction facing downwards is the Y-coordinate positive direction.

Then, for the black pixel group on the horizontal line, the black run including those pixels is calculated, and it is temporarily registered to the line noise plane in step S62 of FIG. 5. An extremely short black run with about less than sixteen pixels is eliminated, since it has low possibility to be a candidate for the line noise.

Next, in step S63 of FIG. 5, the edge ratio of the black pixel group on the horizontal line is calculated. There are an upper-side edge ratio and a lower-side edge ratio as the edge ratio. The upper-side edge ratio is obtained by finding the number of white pixels that are adjacent to the upper side of the black run pixel group and calculating the ratio thereof. That is, when all the pixels on the upper side of the black run pixel group are white pixels, the edge ration becomes 100%. The lower-side edge ratio is obtained by finding the number of white pixels that are adjacent to the lower side of the black run pixel group and calculating the ratio thereof. As the edge ratio, either the upper-side edge ratio or the lower-side edge ratio having the larger value is employed.

Next, in step S64 of FIG. 5, the line noise reliability is calculated. The line noise reliability is calculated by combining the black run and the edge ratio. Here, it is simply obtained as a product. That is, even when the black run is long, the reliability becomes small if the edge ratio is low.

Then, in step S65 of FIG. 5, the line noise reliability calculated in this way is registered to the line noise plane.

Figure 10:
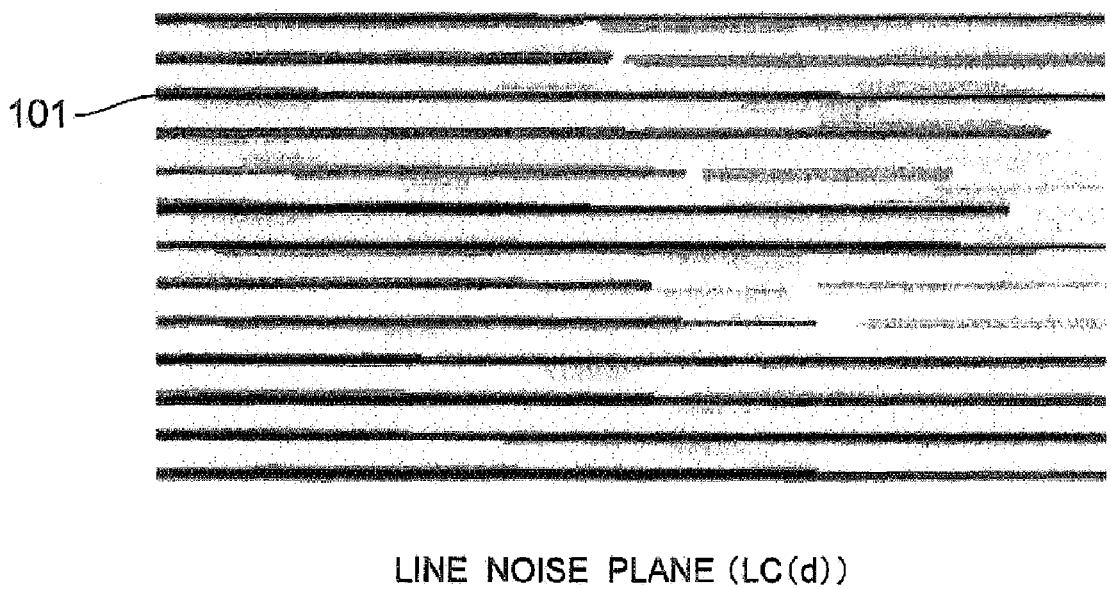
FIG. 10 is an illustration for showing an example of a line noise plane.

FIG. 10 shows the line noise reliability of the binary image of FIG. 9A, which is obtained in this way. This line noise reliability plane is expressed as LC(d). In FIG. 9, the image is displayed in such a setting that the density becomes higher as the line noise reliability becomes larger.

In FIG. 9A, the black run of the line shown with a reference numeral 91 is separated into two. This is because the line in the vicinity of the point shown with a reference numeral 92 is disconnected, and a white pixel group appears thereby. In FIG. 10, the line of the black run shown with a reference numeral 101 corresponds to the binary image of the line 91 in FIG. 9A.

The reason for the line noise reliability on the left side of the reference numeral 101 in FIG. 10 is large and that of the right side is small is because the black pixel group on the left side of the reference numeral 101 in FIG. 10 is connected to a black pixel group in the area on the left side thereof (not shown in this image).

Next, in step S66 of FIG. 5, it is judged whether or not the line noise reliability calculation processing is completed for all the lines. When judged that it is not completed, the next line is set and the procedure is returned to the step S62. When judged that it is completed for all the lines, the procedure is advanced to the step S7 of FIG. 3.

Then, in the step S7 of FIG. 3, the line noise reliability is checked for all the lines, and the maximum value is registered to the memory as the line noise reliability maximum value that corresponds to the current rotation angle d.

Subsequently, in step S8 of FIG. 3, it is judged whether or not the entire rotation range is covered. When judged that it is not all covered, an angle incremented by one degree is set as a next rotation angle, for example, and the procedure is returned to the step S5. When judged that it is completed, the procedure is advanced to step S9 of FIG. 3. Normally, 180 degrees may be sufficient to be set as the rotation range. If the range of the directions of all the line noises is known beforehand, the rotation angles corresponding to the range of those directions may be set as the initial value and the final value.

Next, in step S9 of FIG. 3, the candidates for the rotation angle are selected through searching the rotated angles and corresponding line noise reliabilities that were registered to the memory in the step S7. This can be performed in the following manner.

1) The maximum line noise reliability is searched for all the rotation angles. When the value obtained thereby is larger than the preset threshold value, it is registered to the memory as a rotation angle candidate. When the value obtained thereby is smaller than the threshold value, the rotation angle candidate selection processing is ended.

2) The line noise elimination processing for the rotations angles close to the already-selected angle (for example, +15 and −15 degrees) is excluded since it is redundant.

3) The maximum line noise reliability among the remained rotation angles is searched. When the value obtained thereby is larger than the preset threshold value, it is registered to the memory as a rotation angle candidate. When the value obtained thereby is smaller than the threshold value, the rotation angle candidate selection processing is ended.

4) The processing described above in 2 and 3 is repeatedly executed until there is no more unprocessed rotation angle remained.

Through the above-described processing, a plurality of rotation angle candidates corresponding to the line noise directions are selected.

Then, in step S10 of FIG. 4, the initial values of the rotation angle candidates are set.

Thereafter, in step S11 of FIG. 4, the image rotating device 25 shown in FIG. 2 rotates the above-described binary image by the designated rotation angle d. This processing is the same as the processing of the step S5 in FIG. 3, so that the explanation thereof is omitted.

Then, in step S12 of FIG. 4, the line noise reliability calculating device 26 shown in FIG. 2 calculates the line noise reliability. This processing is the same as the processing of the step S6 in FIG. 3, so that the explanation thereof is omitted.

Next, in step S13 of FIG. 4, the noise area determining device 27 shown in FIG. 2 analyzes the line noise plane LC(d) and the binary image B(d), and determines the line noise area in the following manner.

1) over the entire black pixels, the line noise plane of about eight pixels on the upper and lower side is searched to determine the line noise reliability maximum values of the upper and lower sides, respectively. The determined maximum values are expressed as LNC_U and LNC_D, respectively. It is noted, however, that when it reaches a white pixel in searching the pixels on the upper and lower sides, the search is ended. Either LNC_U or LNC_D that has the smaller value is compared to the line noise reliability of the own pixels. When the former is larger than the reliability of the own pixels, the reliability of the own pixels is replaced with the former.

This processing is effective for dealing with the line noise with the width of three pixels or more. The line on the inner side of the wide line noise has the small edge ratio, so that the line noise reliability also becomes small. The line noise reliability of the line on the inner side is corrected to a proper value through this processing.

2) Then, the area with the line noise reliability of more than the threshold value on the line noise plane is determined as the line noise determined area. If the threshold value is too large, the line noise eliminating performance is deteriorated. Meanwhile, the fingerprint ridgelines are eliminated if it is too small. Therefore, it is desirable to set a relatively small value within the range with which the fingerprint ridgelines are not eliminated. The dark lines in FIG. 11 indicate the determined area that is determined based on the line noise reliability shown in FIG. 10.

3) Subsequently, if there is an undetermined area within the range of two pixels on the upper and lower sides of the line noise determined area, that area is determined as a line noise adjacent area. It often happens that the line noise adjacent area is in high density due to the influence of the line noise. Thus, the line noise adjacent area is also set as the target of the density conversion.

Figure 11:
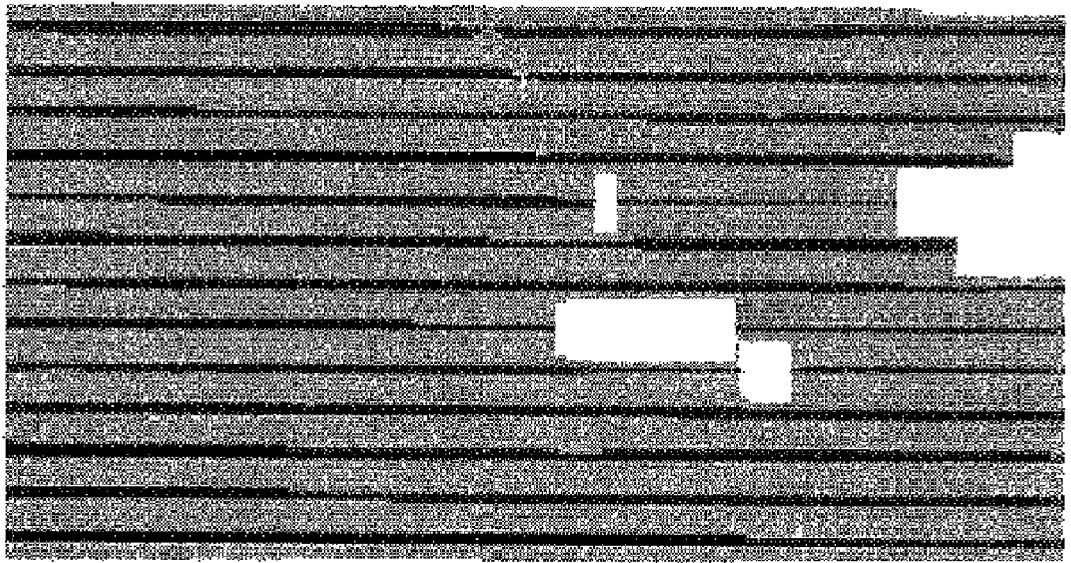
FIG. 11 is an illustration for describing a line noise determined area and a line noise adjacent area.

4) Next, the area surrounded by two line noise determined areas within a range of about eight pixels on the upper and lower sides is also determined as a line noise adjacent area. It also often happens that such area surrounded by a plurality of line noises is in high density due to the influence of the line noises. Thus, such area is also set as the target of the density conversion. The areas displayed with low density in FIG. 11 indicate the line noise adjacent areas that are determined based on the line noise reliability of FIG. 10. The areas other than the white background in FIG. 11 are the line noise areas corresponding to the line noise reliability of FIG. 10. This line noise area plane is expressed as LA(d).

Next, in step S14 of FIG. 4, the density converting device 28 shown in FIG. 2 uses the input image GI and converts the density of the pixels in the line noise area by a local image enhancing method (adaptive histogram equalization or adaptive contrast stretch). The local image enhancing method used for this contrast conversion employs a method that is equivalent to the one used in the step S2. The reference range of the local image enhancing method is set as the pixel group of about sixteen pixels on the right and left sides in the horizontal direction.

The reason for restricting the reference range to the pixel group of one horizontal line is to restrict it to the area that has about the same line noise density. By restricting it to the area having about the same noise density, it is expected to eliminate the line noise component from the density-converted image.

In general, it is common for the background density in the vicinity of the edges of the line noise to become uniformly lightened from the center part of the line noise towards the outer side. It is considered that this phenomenon occurs due to the blur of the ink in the vicinity of the edges of the line noise or due to the influence of the sensitivity of the sensor.

When the reference area is set as the entire adjacent line noise areas, it is not possible to enhance only the fingerprint ridgelines accurately even if the local enhancement is performed because fluctuation in the background density is large. When the reference area is restricted to one line of the line noise direction, a uniform background density can be expected. As a result, it is possible to enhance only the ridgelines in a proper manner.

Figure 12:
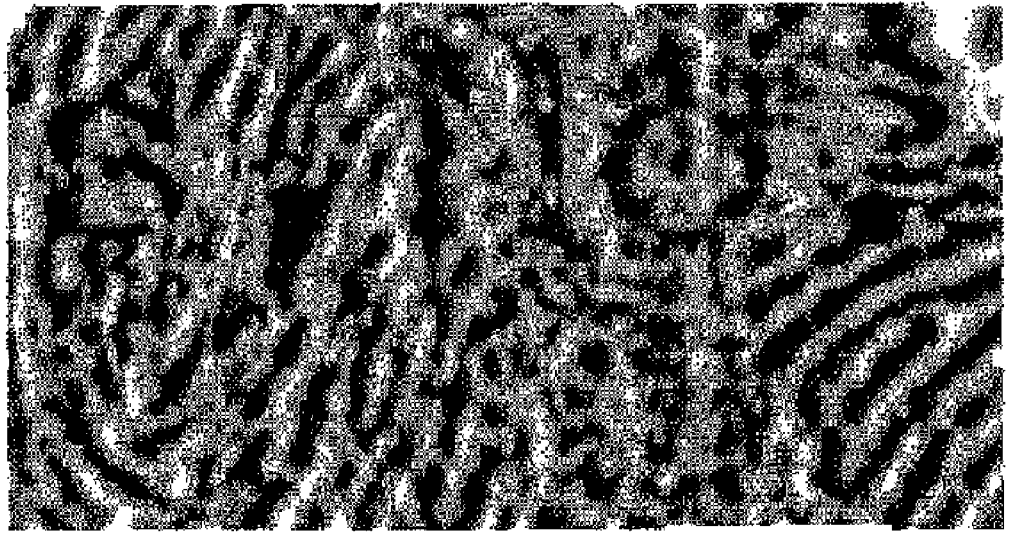
FIG. 12 is an illustration for showing an image that is obtained by applying density conversion on the image shown in FIG. 9B.

FIG. 12 shows the result of performing the density conversion on the area of FIG. 9B. This fingerprint image is expressed as GR(d). Comparing FIG. 9B to FIG. 12, it can be fond that the line noise components are almost eliminated, and the fingerprint ridgelines are enhanced.

Next, in step S15 of FIG. 4, the image rotating device 25 shown in FIG. 2 rotates the image inversely. This processing can be achieved by designating the angle −d that is the angle to which a negative code is applied to the rotation angle designated in the step S11 of FIG. 4. This image is expressed as GR' (d).

Then, in step S16 of FIG. 4, the image synthesizing device 29 shown in FIG. 2 produces a single image by synthesizing the two images; one is the image GR' (d) that is obtained by eliminating the line noise for the current rotation angle candidate d, and the other is the image GC that is obtained as a result of the processing performed therebefore for the previous rotation angle candidates. Regarding the synthesizing method in this example, the lower density among the densities in the two images is employed for each pixel. This is because the density value of the image from which the line noise is eliminated normally becomes small. The image GC' (d obtained as a result of the above-described processing is registered to the memory as the latest synthesized image GC.

However, when the current rotation angle d is the first rotation angle candidate, there is no result obtained as a result of previous line elimination processing. Thus, the result of the processing executed in the step S15, that is, GR' (d), is employed as the latest synthesized image GC without being synthesized.

Figure 14A:
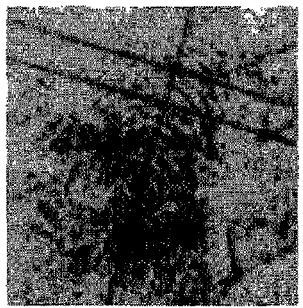
FIG. 14A is an illustration for showing a second example of an input image.
Figure 14B:
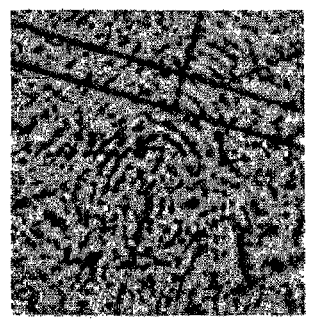
FIG. 14B is an illustration of an image that is obtained by enhancing the image of FIG. 14A.

The image synthesis will be described in a specific way by referring to the second fingerprint image example shown in FIG. 14. FIG. 14A shows an input image GI, and FIG. 14B shows an enhanced image GE of the image GI.

Figure 14C:
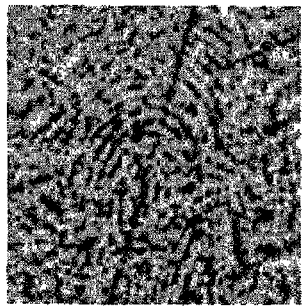
FIGS. 14C and 14D are illustrations of images that are obtained by eliminating the line noises from the image shown in FIG. 14B.
Figure 14D:
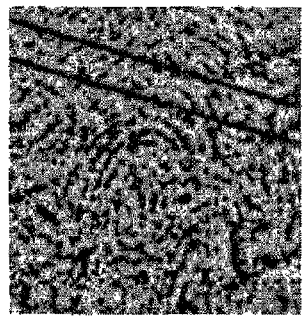
Figure 14E:
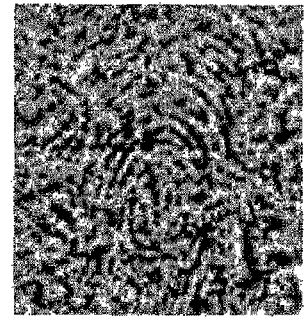
FIG. 14E is an illustration of an image that is obtained by synthesizing the image of FIG. 14C and the image of FIG. 14D.

There are line noises in two directions in the fingerprint image of FIG. 14A. The line noises are detected optimally when the image is rotated by 15 degrees and 106 degrees in a counterclockwise direction, so that these two angles are the rotation angle candidates. FIG. 14C shows an image GR' (15) that is obtained as a result of the processing performed with the first rotation angle candidate of 15 degrees, and FIG. 14D shows an image GR' (106) that is obtained as a result of the processing performed with the next rotation angle candidate of 106 degrees. It can be seen from those two fingerprint images that the line noises in each direction are eliminated.

First, the image GR' (15) that is obtained as a result of the processing performed with the first rotation angle candidate of 15 degrees is registered to the memory as GC. In the processing of the next rotation angel candidate of 106 degrees, the image GR' (106) that is the result of the current processing is generated. Here, the image synthesizing device 29 shown in FIG. 2 synthesizes the two images by the above-described method to generate the synthesized image GC' (106). This synthesized image GC' (106) is replaced with the image already-registered to the memory, and registered to the memory as a new GC.

The image synthesizing method in this example is equivalent to the followings. That is, when there are a plurality of line noise directions, the processing is executed individually for each direction, and a plurality of images from which the line noises are eliminated are synthesized. As another example, it is also possible to consider the image from which a line noise of a given direction is eliminated as the input image, and eliminate the line noise of a next direction therefrom. With this example, however, one of the line noises of another direction is already being eliminated in a region where the line noises intersect with each other. Thus, it tends to become difficult to detect the other line noise even if there is the line noise in the concerned direction.

Next, in step S17 of FIG. 4, it is judged whether or not the processing for all the rotation angle candidates is completed. When judged that it is not completed, the angle registered as the next rotation angle candidate is set, and the procedure is returned to the step S11. When judged that it is completed, the procedure is advanced to step S18 of FIG. 4.

Then, in the step S18 of FIG. 4, the image in which the line noises are eliminated and the ridgelines are enhanced is outputted. In addition to a monitor and a printer, a matching device and a feature extracting device are also considered as the output destinations.

Figure 13:
FIG. 13 is an illustration for showing an example of the image obtained as a result.

FIG. 13 shows an image that is obtained as a result of the processing performed on the input image of FIG. 6 through the above-described steps. This fingerprint image is expressed as GO. It can be seen from FIG. 13 that the line noises are eliminated therefrom and only the fingerprint ridgelines are enhanced.

In this case, there is only one rotation angle candidate (45 degrees), so that the output image GO is the same image as GR' (45) and GC.

This example has been described by referring to the case of fingerprint images. However, another example of the present invention can also be applied effectively to palm print images that have the similar patterns as those of the fingerprints. When the exemplary aspect of the present invention is applied to the palm print image, it is possible to eliminate the line noises effectively through setting the reference area as a straight-form pixel group of about twenty pixels on the right and left sides in the line noise direction, since the average ridgeline pitch of the palm print is wider by about 25% than that of the fingerprint.

Further, in this example, the density-enhanced image obtained by enhancing the density of the input image is set as the target image of the line noise elimination processing. However, still another example of the present invention can also set the input image in which the density is not enhanced as the target image of the processing.

In the noise elimination processing of the exemplary aspect of the present invention, the background density obtained as a result of the noise area elimination processing is converted into the density of the same level as the background density of the non-noise image area so as to eliminate the noise by making it inconspicuous. Unless the background density of the non-noise area is uniform, the effect of the noise elimination processing cannot be expected.

When there is a conspicuous background noise as in the case of the latent fingerprint that is left behind, the background density of the input image is not uniform. This is the reason for setting the density enhanced image, which is obtained by making the background density over the entire area uniform with the local image enhancement processing, as the target image of the noise elimination processing.

However, in the case of a scanned image (ink fingerprint image) on a fingerprint mount on which a fingerprint is impressed with ink, the background density is uniform since the background is a paper surface. With such image, the effect of the noise elimination processing can be expected even if the input image is taken as the target image thereof.

Figure 15A:
FIG. 15A is an illustration for showing an example of an ink fingerprint image.

There are cases where the ruled lines for indicating the frame for impressing the fingerprint are contained as the line noises in the ink fingerprint images. For example, FIG. 15A is an example of such fingerprint image. In this case, it appears as a line noise of almost a vertical direction in the vicinity of the right edge of the image.

When the line noises of the rule lines are eliminated from the ink fingerprint image by using the example of present invention, the step S2 of FIG. 3 may be omitted and the density conversion processing executed in the step S14 of FIG. 4 may be performed in the following manner.

In the step S14 of FIG. 4, the density converting device 28 shown in FIG. 2 converts the density by performing the adaptive contrast stretch on the pixels in the area that corresponds to the line noise area of the input image. In that stage, a second reference range is defined for determining the target minimum value and the target maximum value of the density conversion. The second reference range is in the vicinity of the concerned pixel, and it is defined as a pixel group in the non-line noise area that is adjacent to the line noise area.

The density is converted in the following manner.

1) A pixel group of about thirty-three pixels in total from the concerned pixel in the line noise direction is extracted, and the minimum density value and the maximum density value among those are defined as minP and maxP, respectively.

2) Two directions are searched in the orthogonal direction from the concerned pixel to determine two pixels (because there are two directions), which are the pixels out of the line noise area but adjacent to the line noise area.

3) A pixel group of about thirty-three pixels in total from each of the adjacent pixels in the line noise direction is extracted, respectively, and the maximum density values and the minimum density values among those are determined.

4) A weighted average of the two minimum density values in the two directions is calculated, and it is defined as minT. The added weight is defined as the reciprocal of the distance from the concerned pixel to the adjacent pixel. Similarly, a weighted average of the two maximum density values is calculated, and it is defined as maxT.

Figure 15B:
FIG. 15B is an illustration for showing an image that is obtained by eliminating the line noise from the image of FIG. 15A.
Figure 16A:
FIG. 16A is an example of an image that is obtained by eliminating the noises from the image of FIG. 6 by a conventional technique.
Figure 16B:
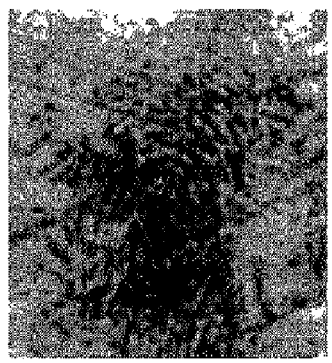
FIG. 16B is an example of an image that is obtained by eliminating the noises from the image of FIG. 14A by a conventional technique.

5) The density of the concerned pixel is converted by the contrast stretch based on a following Expression 1.

$$g' = \frac{(g - \text{min}P) \times (\text{max}T - \text{min}T)}{\text{max}P - \text{min}P} + \text{min}T \quad \text{[Expression 1]}$$

where,
g': density value after conversion
g: density value of input image
minP: local minimum value
maxP: local maximum value
minT: target minimum density value
maxT: target maximum density value FIG. 15B shows an image GO that is obtained by eliminating the line noises from the image of FIG. 15A in the manner described above. It can be seen by comparing FIG. 15B to FIG. 15A that the line noise components are almost eliminated, and the density is converted into the same level as the background density of the input image.

Next, the effect of the fingerprint image enhancing device 10 will be described.

The fingerprint image enhancing device 10 detects a straight-form line noise, and uses a local image enhancing method (adaptive histogram equalization or adaptive contrast stretch) restrictively on the noise area to enhance the ridgelines so as to eliminate the line noise.

As a result, enhancement and extraction of the fingerprint ridgelines can be achieved easily. When it is applied to the latent fingerprint that is left behind, it is possible to display the enhanced fingerprint ridgelines with the line noise being eliminated. Thus, it helps the investigator to make a judgment easily. Further, feature extraction can be performed by using the image from which the line noise is eliminated, so that more accurate feature quantity can be extracted. As a result, the accuracy of fingerprint matching is improved as well.

The part outside the noise area of the image is enhanced (the step S2 of FIG. 3) by the method equivalent to he local image enhancing method (the step s14 of FIG. 4) which is used for converting the density inside the noise area. Through this, there is generated a noise-eliminated image in which the density levels inside and outside the noise area are equalized.

When it is applied to the fingerprint image, the line noise can be eliminated effectively by setting the reference area as a straight-form pixel group of about thirty-three pixels in the line noise direction. The fingerprint ridgelines have the average ridgeline pitch of ten pixels (0.5 mm in actual distance). Thus, pixels in the number of about three times as the pixels in the pitch are considered rational as the minimum area that includes the fluctuation of the crossing fingerprint ridgelines that are tilted to some extent.

When it is applied to the palm print image, the reference area may be set as a pixel group of about forty pixels, since the average ridgeline pitch of the palm print is wider by 25% than that of the fingerprint.

Through setting the reference area not as the entire adjacent line noise area but restricting it to the straight-form pixel group (fro example, a pixel group of one line) along the line noise direction, the uniform background density can be taken the reference density. As a result, only the ridgelines can be enhanced in a proper manner.

When detecting the line noise from the fingerprint image, not only the number of consecutive black pixels in a given direction, but also the white pixel ratio of the lines adjacent to the line of the consecutive black pixels in the orthogonal direction is also detected as the edge feature quantity from the binary image. Then, the line noise is detected based on a combination of the number of consecutive black pixels and the edge feature quantity. Thus, the straight-form wide fingerprint ridgeline is not mistakenly detected as a line noise.

With this, it is possible to eliminate the line noises in a plurality of directions. It is also possible to eliminate the line noise with no periodicity (for example, when there is only a single line noise). Further, it is possible to eliminate the line noises having the similar periodicity as that of the fingerprint ridgelines.

When the image is enhanced by applying the adaptive contrast stretch upon the pixels on the detected line noise and the pixels in the adjacent area thereof, the maximum value and the minimum value among the density values of the non-line noise area in the vicinity of the concerned pixel are used as the target values for converting the density. With this, it is possible to eliminate the line noise from the image that is not being enhanced.

Next, other exemplary embodiments of the present invention will be described point by point.

In another exemplary embodiment of the line noise eliminating apparatus, the input image is a fingerprint image or a palm print image, and the density converting device therein may: set a straight-form area (constituted with pixels of about three times the number of pixels that correspond to the average ridgeline pitch along the line noise direction with respect to the concerned pixel) as a first reference area; extract two areas constituted with almost the same number of pixels as that of the reference area as a second reference area from the non-line noise areas that are adjacent to the upper and lower sides of the line noise area that contains the concerned pixel and determine the density conversion target minimum value and the density conversion target maximum value based on the minimum density value and the maximum density value of the pixels contained in the second reference area. The "ridgeline pitch" is a distance (pitch) between each of the centers of the neighboring ridgelines.

In this way, the maximum value and the minimum value among the density values of the non-line noise area in the vicinity of the concerned pixel are used as the density conversion target values when enhancing the pixels in the detected line noise area of the image. Thus, the line noise can be eliminated even when the input image is taken as the target of the noise elimination processing.

Further, since the straight-form area along the line noise direction is set as the reference area, a uniform background density can be taken as the reference density. As a result, it is possible to enhance only the ridgelines in a proper manner.

Furthermore, the number of pixels in the reference area is set as about three times the average ridgeline pitch, so that it is possible to set, as the reference area, the area that includes the fluctuation of the fingerprint ridgelines that intersect with a specific direction in a tilted manner to some extent. Therefore, the line noise can be eliminated effectively. The number of pixels in the reference area is about thirty-one pixels in the case of a fingerprint image (the average ridgeline pitch is about 0.5 mm) of 500 dpi, and it is about forty pixels (25% as many) in the case of a palm print image.

In still another exemplary embodiment of the line noise eliminating apparatus, the input image is a fingerprint image or a palm print image, and the density converting device therein may set a straight-form area constituted with pixels of about three times the number of pixels that correspond to the average ridgeline pitch along the line noise direction with respect to the concerned pixel) as the reference area to perform the local image enhancement thereon.

With this, a uniform background density can be taken as the reference density since the straight-form area along the line noise direction is set as the reference area. As a result, it is possible to enhance only the ridgelines in a proper manner.

Furthermore, the number of pixels in the reference area is set as about three times the actual dimension of the ridgeline, so that it is possible to set, as the reference area, the area that includes the fluctuation of the fingerprint ridgelines that intersect with a specific direction in a tilted manner to some extent. Therefore, the line noise can be eliminated effectively.

In the exemplary embodiments of the line noise eliminating apparatus, the image synthesizing device may synthesize the images by taking the minimum density value (among the densities of the pixels that correspond to each density converted image) as the density of each pixel in the synthesized image.

With this, it is possible to obtain a clear synthesized image by selecting the noise-eliminated pixels from a plurality of pixels.

In another exemplary embodiment of the line noise eliminating method, the input image is a fingerprint image or a palm print image to which the enhancement processing is not performed and, in a density conversion step, a straight-form area (constituted with pixels of about three times the number of pixels that correspond to the average ridgeline pitch along the line noise direction with respect to the concerned pixel) is set as a first reference area; two areas constituted with almost the same number of pixels as that of the reference area are extracted as a second reference area from the non-line noise areas that are adjacent to the upper and lower sides of the line noise area that contains the concerned pixel; and the density conversion target minimum value and the density conversion target maximum value are determined based on the minimum density value and the maximum density value of the pixels contained in the second reference area.

With this, the line noise can be eliminated even when the input image is taken as the target of the noise elimination processing.

Further, a uniform background density can be taken as the reference density. As a result, it is possible to enhance only the ridgelines in a proper manner.

Furthermore, it is possible to set, as the reference area, the area that includes the fluctuation of the fingerprint ridgelines that intersect with a specific direction in a tilted manner to some extent. Therefore, the line noise can be eliminated effectively.

In still another exemplary embodiment of the line noise eliminating method, the input image is a fingerprint image or a palm print image and, in a density conversion step, a straight-form area (constituted with pixels of about three times the number of pixels that correspond to the average ridgeline pitch along the line noise direction with respect to the concerned pixel) is set as the reference area to perform the local image enhancement thereon.

With this, a uniform background density can be taken as the reference density since the straight-form area along the line noise direction is set as the reference area. As a result, it is possible to enhance only the ridgelines in a proper manner.

Furthermore, the number of pixels in the reference area is set as about three times the actual dimension of the ridgeline, so that it is possible to set, as the reference area, the area that includes the fluctuation of the fingerprint ridgelines that intersect with a specific direction in a tilted manner to some extent. Therefore, the line noise can be eliminated effectively.

In the exemplary embodiments of the line noise eliminating method, at the image synthesizing step, the images may be synthesized by setting the minimum density value (among the density of the pixels that correspond to each density converted image) as the density of each pixel in the synthesized image.

With this, it is possible to obtain a clear synthesized image by selecting the noise-eliminated pixels from a plurality of pixels.

In another exemplary embodiment of the line noise eliminating program, the input image is a fingerprint image or a palm print image to which the enhancement processing is not performed and, in a density conversion processing, a straight-form area (constituted with pixels of about three times the number of pixels that correspond to the average ridgeline pitch along the line noise direction with respect to the concerned pixel) is set as a first reference area; two areas constituted with almost the same number of pixels as that of the reference area are extracted as a second reference area from the non-line noise areas that are adjacent to the upper and lower sides of the line noise area that contains the concerned pixel; and the density conversion target minimum value and the density conversion target maximum value are determined based on the minimum density value and the maximum density value of the pixels contained in the second reference area.

With this, the line noise can be eliminated even when the input image is taken as the target of the noise elimination processing.

Further, a uniform background density can be taken as the reference density. As a result, it is possible to enhance only the ridgelines in a proper manner.

Furthermore, it is possible to set, as the reference area, the area that includes the fluctuation of the fingerprint ridgelines that intersect with a specific direction in a tilted manner to some extent. Therefore, the line noise can be eliminated effectively.

In still another exemplary embodiment of the line noise eliminating program, the input image is a fingerprint image or a palm print image and, in a density conversion processing, a straight-form area (constituted with pixels of about three times the number of pixels that correspond to the average ridgeline pitch along the line noise direction with respect to the concerned pixel) is set as the reference area to perform the local image enhancement thereon.

With this, a uniform background density can be taken as the reference density since the straight-form area along the line noise direction is set as the reference area. As a result, it is possible to enhance only the ridgelines in a proper manner.

Furthermore, the number of pixels in the reference area is set as about three times the actual dimension of the ridgeline, so that it is possible to set, as the reference area, the area that includes the fluctuation of the fingerprint ridgelines that intersect with a specific direction in a tilted manner to some extent. Therefore, the line noise can be eliminated effectively.

In the exemplary embodiments of line noise eliminating program, the images may be synthesized with the image synthesizing processing by setting the minimum density value (among the density of the pixels that correspond to each density converted image) as the density of each pixel in the synthesized image.

With this, it is possible to obtain a clear synthesized image by selecting the noise-eliminated pixels from a plurality of pixels.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A line noise eliminating apparatus, includes:
   an image binarizing device which generates a binary image by binarizing an input image that includes a line noise;
   a line noise reliability calculating device which rotates the binary image by a plurality of rotation angles to generate respective rotated images, calculates an edge feature quantity for each of black-pixel consecutive areas in the rotated images, and calculates line noise reliability based on the edge feature quantities;
   a line noise area determining device which selects, based on the line noise reliability, a rotation angle candidate with which a direction of the line noise becomes consistent with a prescribed direction from the rotation angles, and determines a line noise area of the respective rotated images that correspond to each of the rotation angle candidates based on the line noise reliability;

a density converting device which generates a density-converted image by applying local image enhancement on an area that corresponds to the line noise area of the input image so as to convert the density into density of pixels that correspond to the input image; and an image synthesizing device which generates a synthesized image by synthesizing the density-converted images that correspond to each of the rotation angle candidates, when there are a plurality of the rotation angle candidates.

2. The line noise eliminating apparatus as claimed in claim 1, wherein the input image is a fingerprint image or a palm print image, and the density converting device: sets a straight-form area, which is constituted with pixels of about three times as many as a number of pixels that correspond to an average ridgeline pitch along the line noise direction with respect to a concerned pixel, as a first reference area; extracts two areas constituted with almost same number of pixels as that of the first reference area as a second reference area from non-line noise areas that are adjacent to upper and lower sides of the line noise area that contains the concerned pixel; and determines a density conversion target minimum value and a density conversion target maximum value based on a minimum density value and a maximum density value of the pixels contained in the second reference area.

3. A line noise eliminating apparatus, includes:

an image enhancing device which generates a density-enhanced image by applying local image enhancement on an input image that includes a line noise;

an image binarizing device which generates a binary image by binarizing the input image; a line noise reliability calculating device which rotates the binary image by a plurality of rotation angles to generate respective rotated images, calculates an edge feature quantity for each of black-pixel consecutive areas in the rotated images, and calculates line noise reliability based on the edge feature quantities;

a line noise area determining device which selects, based on the line noise reliability, a rotation angle candidate with which a direction of the line noise becomes consistent with a prescribed direction from the rotation angles, and determines a line noise area of the respective rotated images that correspond to each of the rotation angle candidates based on the line noise reliability;

a density converting device which generates a density-converted image by applying local image enhancement, by a similar method as that of the image enhancing device, on an area that corresponds to the line noise area of the input image so as to convert the density to density of pixels that correspond to the density-enhanced image; and an image synthesizing device which generates a synthesized image by synthesizing the density-converted images that correspond to each of the rotation angle candidates, when there are a plurality of the rotation angle candidates.

4. The line noise eliminating apparatus as claimed in claim 3, wherein the input image is a fingerprint image or a palm print image, and the density converting device sets a straight-form area, which is constituted with pixels of about three times as many as a number of pixels that correspond to an average ridgeline pitch along the line noise direction with respect to a concerned pixel, as a reference area to perform the local image enhancement thereon.

5. The line noise eliminating apparatus as claimed in claim 1, wherein the image synthesizing device synthesizes the images by setting the density of each pixel in the synthesized image as a minimum density value among the density of the pixels that correspond to each of the density-converted images.

6. A line noise eliminating means, includes:

an image binarizing means for generating a binary image by binarizing an input image that includes a line noise;

a line noise reliability calculating means for rotating the binary image by a plurality of rotation angles to generate respective rotated images, calculating an edge feature quantity for each of black-pixel consecutive areas in the rotated images, and calculating line noise reliability based on the edge feature quantities;

a line noise area determining means for selecting, based on the line noise reliability, a rotation angle candidate with which a direction of the line noise becomes consistent with a prescribed direction from the rotation angles, and determining a line noise area of the respective rotated images that correspond to each of the rotation angle candidates based on the line noise reliability;

a density converting means for generating a density-converted image by applying local image enhancement on an area that corresponds to the line noise area of the input image so as to convert the density into density of pixels that correspond to the input image; and an image synthesizing means for generating a synthesized image by synthesizing the density-converted images that correspond to each of the rotation angle candidates, when there are a plurality of the rotation angle candidates.

7. A line noise eliminating means, includes:

an image enhancing means for generating a density-enhanced image by applying local image enhancement on an input image that includes a line noise;

an image binarizing means for generating a binary image by binarizing the input image;

a line noise reliability calculating means for rotating the binary image by a plurality of rotation angles to generate respective rotated images, calculating an edge feature quantity for each of black-pixel consecutive areas in the rotated images, and calculating line noise reliability based on the edge feature quantities;

a line noise area determining means for selecting, based on the line noise reliability, a rotation angle candidate with which a direction of the line noise becomes consistent with a prescribed direction from the rotation angles, and determining a line noise area of the respective rotated images that correspond to each of the rotation angle candidates based on the line noise reliability;

a density converting means for generating a density-converted image by applying local image enhancement, by a similar method as that of the image enhancing device, on an area that corresponds to the line noise area of the input image so as to convert the density to density of pixels that correspond to the density-enhanced image; and an image synthesizing means for generating a synthesized image by synthesizing the density-converted images that correspond to each of the rotation angle candidates, when there are a plurality of the rotation angle candidates.

8. A line noise eliminating method, includes:
an image binarizing to generate a binary image by binarizing an input image that includes a line noise;
a line noise reliability calculating to rotate the binary image by a plurality of rotation angles to generate respective rotated images, calculate an edge feature quantity for each of black-pixel consecutive areas in the rotated images, and calculate line noise reliability based on the edge feature quantities;
a line noise area determining to select, based on the line noise reliability, a rotation angle candidate with which a direction of the line noise becomes consistent with a prescribed direction from the rotation angles, and determine a line noise area of the respective rotated images that correspond to each of the rotation angle candidates based on the line noise reliability;
a density converting to generate a density-converted image by applying local image enhancement on an area that corresponds to the line noise area of the input image so as to convert the density to density of pixels that correspond to the input image; and
an image synthesizing to generate a synthesized image by synthesizing the density-converted images that correspond to each of the rotation angle candidates, when there are a plurality of the rotation angle candidates.

9. The line noise eliminating method as claimed in claim 8, wherein the input image is a fingerprint image or a palm print image to which enhancement processing is not performed, includes:
in the density converting, a straight-form area, which is constituted with pixels of about three times as many as a number of pixels that correspond to an average ridgeline pitch along the line noise direction with respect to a concerned pixel, is set as a first reference area; two areas constituted with almost same number of pixels as that of the first reference area are extracted as a second reference area from non-line noise areas that are adjacent to upper and lower sides of the line noise area that contains the concerned pixel; and a density conversion target minimum value and a density conversion target maximum value are determined based on a minimum density value and a maximum density value of the pixels contained in the second reference area.

10. A line noise eliminating method, includes:
an image enhancing to generate a density-enhanced image by applying local image enhancement on an input image that includes a line noise;
an image binarizing to generate a binary image by binarizing the input image;
a line noise reliability calculating to rotate the binary image by a plurality of rotation angles to generate respective rotated images, calculate an edge feature quantity for each of black-pixel consecutive areas in the rotated images, and calculate line noise reliability based on the edge feature quantities;
a line noise area determining to select, based on the line noise reliability, a rotation angle candidate with which a direction of the line noise becomes consistent with a prescribed direction from the rotation angles, and determine a line noise area of the respective rotated images that correspond to each of the rotation angle candidates based on the line noise reliability;
a density converting to generate a density-converted image by applying local image enhancement, by a similar method as that of image enhancing, on an area that corresponds to the line noise area of the input image so as to convert the density to density of pixels that correspond to the density-enhanced image; and
an image synthesizing to generate a synthesized image by synthesizing the density-converted images that correspond to each of the rotation angle candidates, when there are a plurality of the rotation angle candidates.

11. The line noise eliminating method as claimed in claim 10, wherein the input image is a fingerprint image or a palm print image, includes:
in the density converting, a straight-form area, which is constituted with pixels of about three times as many as a number of pixels that correspond to an average ridgeline pitch along a line noise direction with respect to a concerned pixel, is set as a reference area to perform the local image enhancement thereon.

12. The line noise eliminating method as claimed in claim 8, wherein, in the image synthesizing, the images are synthesized by setting the density of each pixel in the synthesized image as a minimum density value among the density of the pixels that correspond to each of the density-converted images.

13. A non-signal computer readable medium having stored thereon a line noise eliminating program for allowing a computer to execute:
image binarization processing to generate a binary image by binarizing an input image that includes a line noise;
line noise reliability calculation processing to rotate the binary image by a plurality of rotation angles so as to generate respective rotated images, calculate an edge feature quantity for each of black-pixel consecutive areas in the rotated images, and calculate line noise reliability based on the edge feature quantities;
line noise area determining processing to select, based on the line noise reliability, a rotation angle candidate with which a direction of the line noise becomes consistent with a prescribed direction from the rotation angles, and determine a line noise area of the respective rotated images that correspond to each of the rotation angle candidates based on the line noise reliability;
density conversion processing to generate a density-converted image by applying local image enhancement on an area that corresponds to the line noise area of the input image so as to convert the density to density of pixels that correspond to the input image; and
image synthesizing processing to generate a synthesized image by synthesizing the density-converted images that correspond to each of the rotation angle candidates, when there are a plurality of the rotation angle candidates.

14. The line noise eliminating program as claimed in claim 13, wherein the input image is a fingerprint image or a palm print image to which enhancement processing is not performed, and
in the density conversion processing: a straight-form area, which is constituted with pixels of about three times as many as a number of pixels that correspond to an average ridgeline pitch along the line noise direction with respect to a concerned pixel, is set as a first reference area; two areas constituted with almost same number of pixels as that of the first reference area are extracted as a second reference area from non-line noise areas that are adjacent to upper and lower sides of the line noise area that contains the concerned pixel; and a density conversion target minimum value and a density conversion target maximum value are determined based on a minimum density value and a maximum density value of the pixels contained in the second reference area.

15. A non-signal computer readable medium having stored thereon a line noise eliminating program for allowing a computer to execute:

image enhancement processing to generate a density-enhanced image by applying local image enhancement on an input image that includes a line noise;

image binarization processing to generate a binary image by binarizing the input image;

line noise reliability calculation processing to rotate the binary image by a plurality of rotation angles so as to generate respective rotated images, calculate an edge feature quantity for each of black-pixel consecutive areas in the rotated images, and calculate line noise reliability based on the edge feature quantities;

line noise area determining processing to select, based on the line noise reliability, a rotation angle candidate with which a direction of the line noise becomes consistent with a prescribed direction from the rotation angles, and determine a line noise area of the respective rotated images that correspond to each of the rotation angle candidates based on the line noise reliability;

density conversion processing to generate a density-converted image by applying local image enhancement, by a similar method as that of the image enhancement processing, on an area that corresponds to the line noise area of the input image so as to convert the density to density of pixels that correspond to the density-enhanced image; and image synthesizing processing to generate a synthesized image by synthesizing the density-converted images that correspond to each of the rotation angle candidates, when there are a plurality of the rotation angle candidates.

16. The line noise eliminating program as claimed in claim 15, wherein the input image is a fingerprint image or a palm print image, and in the density conversion processing, a straight-form area, which is constituted with pixels of about three times as many as a number of pixels that correspond to an average ridgeline pitch along a line noise direction with respect to a concerned pixel, is set as a reference area to perform the local image enhancement thereon.

17. The line noise eliminating program as claimed in claim 13, wherein, in the image synthesizing processing, the images are synthesized by setting the density of each pixel in the synthesized image as a minimum density value among the density of the pixels that correspond to each of the density-converted images.

* * * * *